United States Patent

Miburn-Bathgate

[11] 3,753,487
[45] Aug. 21, 1973

[54] UNIVERSAL COUPLINGS AND CHAINS INCORPORATING SUCH COUPLINGS

[75] Inventor: Charles Miburn-Bathgate, West Hagley, England

[73] Assignee: Cavamatic Limited, Bridgnorth, Shropshire, England

[22] Filed: Apr. 2, 1971

[21] Appl. No.: 130,637

[52] U.S. Cl. .......................................... 198/177 R
[51] Int. Cl. .......................................... B65g 17/20
[58] Field of Search .................. 198/177; 59/78, 84, 59/91, 93

[56] References Cited
UNITED STATES PATENTS

| 3,102,631 | 9/1963 | King | 198/177 R |
| 2,490,682 | 12/1949 | Freeman | 198/177 R |
| 429,445 | 6/1890 | Hendryx | 59/91 |

FOREIGN PATENTS OR APPLICATIONS

| 1,168,590 | 12/1958 | France | 59/78 |
| 916,288 | 1/1963 | Great Britain | 59/84 |

Primary Examiner—Evon C. Blunk
Assistant Examiner—Douglas D. Watts
Attorney—Imirie & Smiley

[57] ABSTRACT

A universal coupling suitable for connecting chain links of the kind fabricated from metal strip, the coupling comprises two interconnected looped members which are located in planes normal to one another, and each of which has a curved end extending through the curved end of the other member, and a pivot block, trapped between the said curved ends, has two opposed convex surfaces each of which is concentric to an axis normal to the axis of the other surface and contacts the adjacent curved link end so that the axis of the block surface and the axis of the said adjacent link end are in parallel.

4 Claims, 6 Drawing Figures

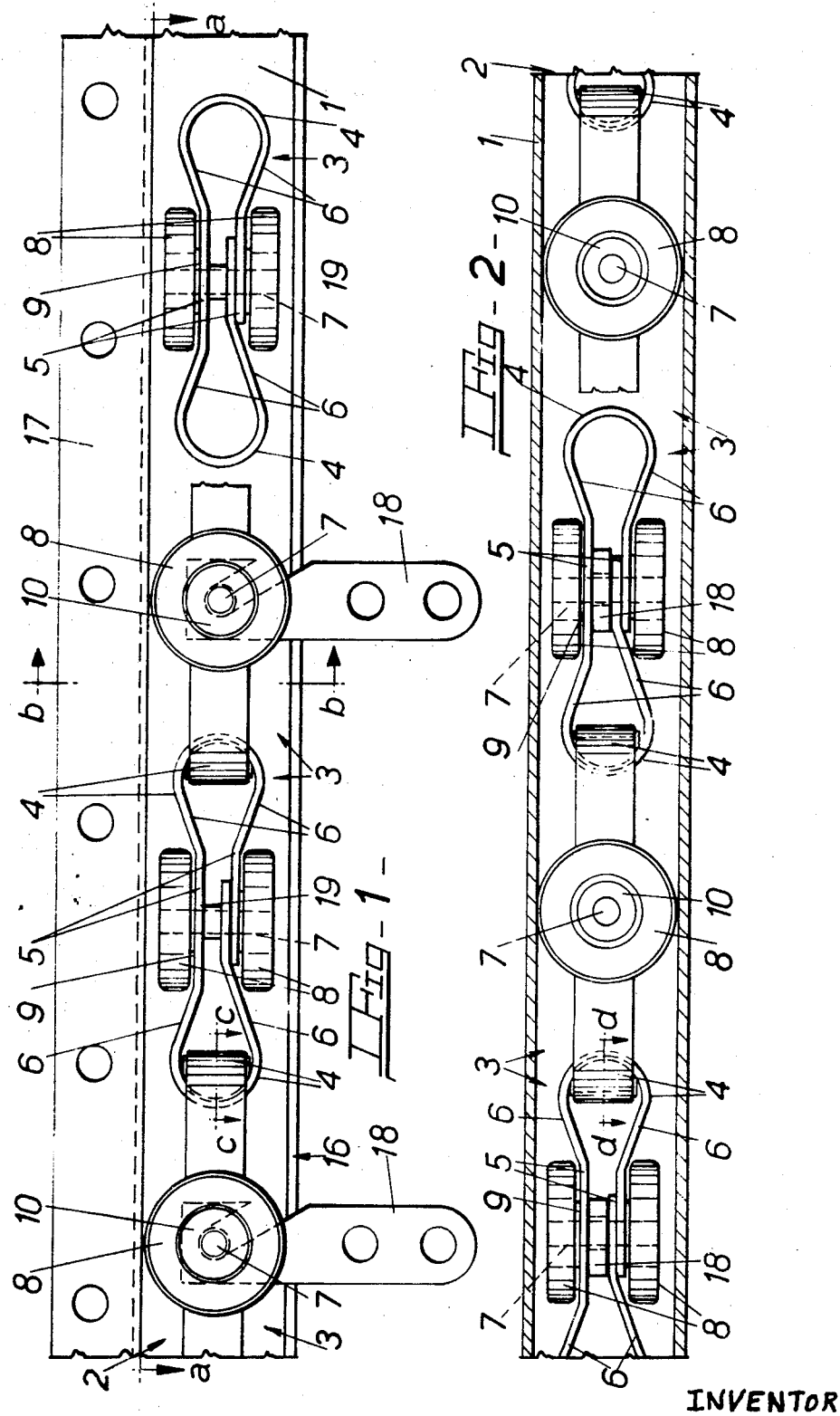

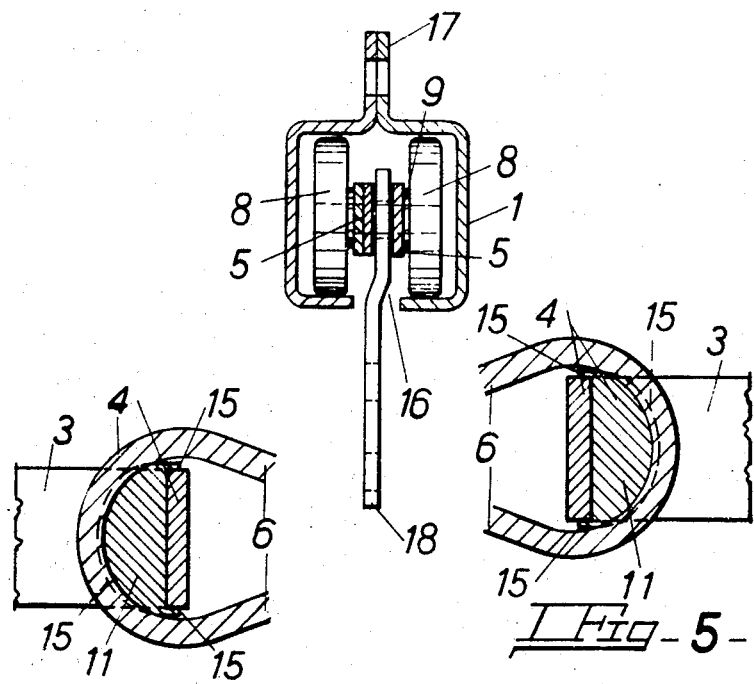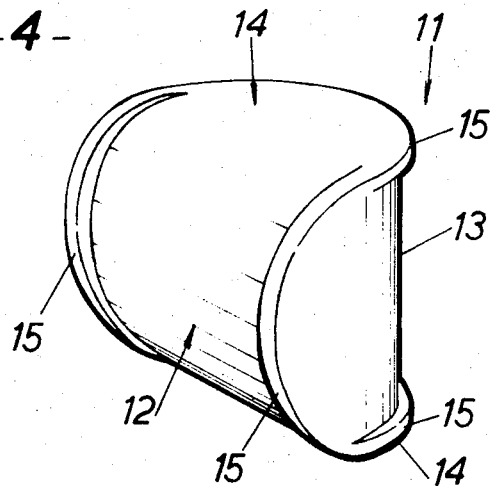

3,753,487

UNIVERSAL COUPLINGS AND CHAINS INCORPORATING SUCH COUPLINGS

This invention relates to universal couplings of the kind comprising two looped members each of which extends through the interior of the other, and to chains, particularly conveyor chains, wherein the links are interconnected by and form parts of the couplings.

In accordance with one aspect of the invention, a universal coupling comprises two looped members which are located in planes normal to one another, each looped member has a curved end which is concentric to an axis normal to the plane of the member and extends through the curved end of the other member, and a pivot block having two opposed convex surfaces each of which is concentric to an axis normal to the axis of the other surface, is trapped between the curved ends of the two looped members with each convex surface in contact with the adjacent curved end and with the axes of each contacting surface and end in parallel.

Preferably the radii of the curved ends of the looped members and of the convex block surfaces are equal, each of the curved ends is located between two lips projecting from the adjacent curved block surface, and the maximum distance between the two convex surfaces is less than the length of the said radii.

In accordance with another aspect of the invention each link of a chain is fabricated from a flat strip of which the plane is normal to the plane of the link, the adjacent curved ends of each two interconnected links of chain form the looped members of one of the universal couplings, and one of the pivot blocks is trapped between the said adjacent curved ends to complete the coupling.

In accordance with a further aspect of the invention, the chain is accommodated in and extends lengthwise of a tubular conveyor track which is rectangular in cross section, each link of the chain has a central longitudinal portion of which the width is less than the maximum width of the curved ends of the link, the central portion is flanked by a pair of wheels which the diameter exceeds the width of the strip, the wheels are rotatable about the axis of a spindle extending through the central portion transversely of the link, and the peripheries of the wheels make rolling contact with the internal surfaces of two opposed walls of the track.

In order that the invention may be understood and carried into practice more readily, reference will now be made to the accompanying drawings wherein:

FIG. 1 is an elevation of part of an overhead conveyor comprising a tubular track of which one half has been removed and one of the links of a chain accommodated within the track has been partly broken away.

FIG. 2 is a section along the line a—a, FIG. 1, in which another one of the chain links has been partly broken away.

FIG. 3 is a section along the line b—b, FIG. 1.

FIG. 4 and 5 are, respectively, enlarged scale sections along the line c—c, FIG. 1, and d—d, FIG. 2, and FIG. 6 is perspective view, on a still larger scale, of one of the pivot blocks provided in the chain.

The overhead conveyor shown in FIGS. 1 and 2 comprises a fixed, tubular track 1 which is square in cross section, and a chain 2 which is accommodated within and extends along the length of the track.

Each link 3 of the chain is fabricated from a flat metal strip of which the plane is normal to the plane of the link; each end 4 of the link is semi-circular, of the same radius as the other end and its external surface is convex; each side of the link has a straight central portion 5 which is parallel to and of the same length as, the central portion of the opposite side, and the two straight portions are spaced apart by a distance less than the radius of the semi-circular ends; each two corresponding ends of the central portions are united to the adjacent semi-circular end by straight, diverging portions 6 of the strip, and the opposite ends of the strip overlap and are secured to one another in one of the central portions 5.

Each chain link is provided with a spindle 7 which extends through a pair of registering holes pierced, respectively, in the two central straight portions of the link sides, and a corresponding one of a pair of wheels 8 is mounted upon each end of the spindle externally of the link. A washer 9 is mounted around the spindle externally of the link side opposite to the overlapping strip ends and between the said link side and the corresponding wheel. The wheels are carried upon roller bearings of which the inner races 10 are fixed to the spindle.

Each two adjoining links of the chain are located in planes which are normal to one another, one curved end of each link extends through the adjacent curved end of the adjoining link so that the two links are interconnected and a pivot block 11 which, for example, may be a stamping, pressing or moulding composed of a low-friction, bearing material, is located and trapped between the internal surfaces of the adjacent curved link ends.

The opposed surfaces 12, 13 of the pivot block are convex and each is concentric to an axis which is normal to the axis of the other convex surface; the radius of each of the convex surfaces is equal to the radius of the internal concave surfaces of the curved link ends but is greater than the maximum distance between the said surfaces; each of the convex surfaces is flanked by two flat and parallel block portions 14 each having a lip 15 which projects beyond the corresponding convex surface; the lips projecting beyond each convex surface are spaced apart by a distance which is equal to the distance between the lips projecting beyond the other convex surface but is not less than the width of the strip from which the chain links are fabricated. Further, although the curved link ends are semicircular and, consequently, span angles of 180°, the convex block surfaces span angles of less than 180°.

Each of the pivot blocks is so located between the concave surfaces of the curved link ends between which it is trapped, that the axis of each convex block surface is parallel to the axis of the adjacent link end. Hence, when the chain is tensioned, the convex surfaces of each pivot block respectively abut against, nest within, and make rolling contact with the internal surfaces of the link ends between which the block is trapped, each of the link ends is located between a corresponding two of the lips 15, and the two interconnected link ends are adapted to swing relatively to one another about the axis of either of the convex block surfaces. Consequently, each two interconnected link ends and the pivot block trapped therebetween, are adapted to function as a universal coupling so that the chain, when driven along the interior of the track, is able to travel easily and smoothly, in any direction around small radius bends in the track.

The internal surfaces of each two opposed and parallel walls of the track 1 are spaced apart by a distance equal to the diameter of the wheels 8 so that the peripheries of the two wheels mounted upon each spindle 7 make rolling contact with the internal surfaces of a corresponding opposed two of the track walls, one of the said walls is formed with a central longitudinal slot 16 whereas the wall opposite to the slotted wall is provided with an external, longitudinal flange 17 so that the track may be secured to any desired means of support.

The spindle 7 extending through each of the alternate links of which the plane is parallel to the slotted track wall, has one end of a bar 18 mounted freely around it between the straight parallel side portions 5 of the link, and the said bar depends freely through the slot 16 to the exterior of the track so that a load may be suspended therefrom. In each of the other links, the bar 18 is replaced by a spacing bush 19 of which the length is equal to the thickness of the bar.

Although the invention has been described with specific reference to the chain of a conveyor, it is apparent that the block 11 is capable of being inserted and trapped between curved ends of any two looped members, other than chain links, to provide a universal coupling which enables the member to be swung relatively to one another about the axis of either of the convex block surfaces 12, 13 thereby simplifying the construction and minimising the production costs of the coupling.

I claim:

1. A conveyor comprising a track and a chain extending lengthwise of said track, said track having a transverse wall extending between side walls with a longitudinally extending slot in its transverse wall, said chain including a plurality of links, each said link comprising a looped member fabricated from flat strip of which the plane is normal to the plane of said link and adjacent ones of said looped members being located in planes normal to one another, the planes of alternate links being parallel with said track transverse wall, each said looped member having a pair of curved ends which respectively are concentric to an axis normal to the plane of the member with the ends of said strip overlapping midway between said curved ends, a curved end of one said looped member extending through and linked with a curved end of an adjacent said looped member, a pivot block trapped between each pair of linked curved ends; said pivot block having two opposed convex surfaces, one of said convex surfaces being concentric to an axis normal to the axis of the other of said convex surfaces, each said convex surface being concentric with and engaging the adjacent one of said curved ends, said axis of each said convex surface and said curved ends being parallel, the overlapping ends and medium portion of said strips constituting the alternate links parallel with said track bottom wall each having aligned bores transversely of each said looped member midway between said curved ends, a spindle extending through each said bores, a pair of wheels mounted on opposite ends of each said spindle and engaging with said track transverse wall on opposite sides of said slot, and a bar mounted at one end on each said shaft and depending through said slot for conveying a load along said track.

2. A conveyor according to claim 1 wherein the central portion of each said looped member through which a spindle extends has a width less than the maximum width of said curved ends.

3. A conveyor according to claim 1 wherein the radius of each said convex surface is equal to the radius of the inner side of said adjacent curved end to constitute a cylindrical bearing, and said pivot block has two lips projecting radially from the opposite sides of each said convex surface of said pivot block, and said adjacent linked curved end is nested between said lips to preclude deviation from said axis.

4. A conveyor according to claim 1 wherein the overlapping ends and medium portion of said strips constituting the links intermediate said alternate links and which are parallel with the track side walls each having aligned bores transversely of each said looped member midway between said curved ends, a shaft extending through each said bores, a pair of wheels mounted on opposite ends of each said shaft and engagable with said track side walls to assist in maintaining said links in alignment.

* * * * *

UNITED STATES PATENT OFFICE
CERTIFICATE OF CORRECTION

Patent No. 3,753,487　　　　Dated August 21, 1973

Inventor(s) Charles MILBURN-BATHGATE

It is certified that error appears in the above-identified patent and that said Letters Patent are hereby corrected as shown below:

Inventor's name should read: --Charles MILBURN-BATHGATE--

Signed and sealed this 20th day of November 1973.

(SEAL)
Attest:

EDWARD M. FLETCHER, JR.　　　　RENE D. TEGTMEYER
Attesting Officer　　　　　　　　Acting Commissioner of Patents